W. Truby,
Manure Fork.
No. 70,135.   Patented Oct. 22, 1867
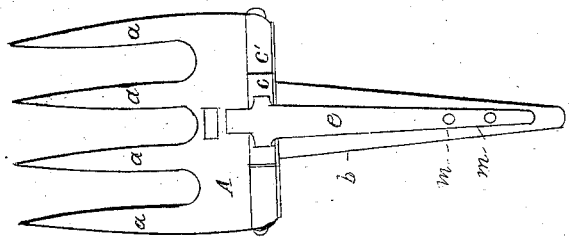
Fig. 2.
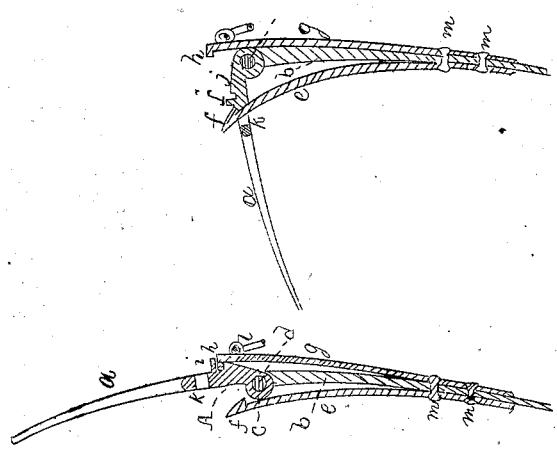
Fig. 4.
Fig. 3.
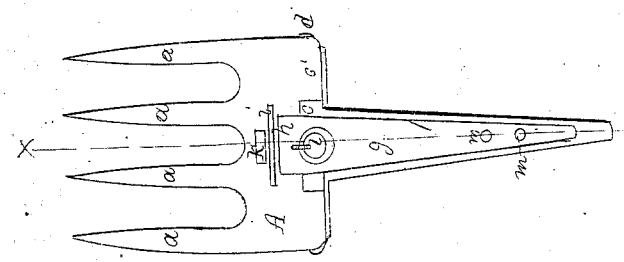
Fig. 1.
Witnesses.
A. R. Evans
John Truby
William Truby
Inventor.

United States Patent Office.

WILLIAM TRUBY, OF BRUSH VALLEY, PENNSYLVANIA.

*Letters Patent No. 70,135, dated October 22, 1867.*

IMPROVEMENT IN MANURE-FORKS, &c.

*The Schedule referred to in these Letters Patent and making part of the same.*

TO ALL WHOM IT MAY CONCERN:

Be it known that I, WILLIAM TRUBY, of Brush Valley, county of Indiana, and State of Pennsylvania, have invented a new and useful Improvement in Forks for Manure and other purposes, and that the following is a full and exact description thereof, reference being had to the accompanying drawings, making a part of this specification, in which—

Figure 1 is a view of the back side of a fork constructed according to my invention.

Figure 2 is a front view of the same.

Figure 3 is a section, taken on the line $x\ x$ of fig. 1; and

Figure 4 the same, showing the fork set in the position of a rake or grapnel.

The object of this invention is to provide a manure or pitch-fork with certain devices, to be hereafter particularly described, by means of which it may be readily changed from an ordinary pitch-fork into a rake, pronged hoe, or grapnel, by means of the simple and inexpensive devices constituting the subject of this invention, without requiring the loss of any appreciable time, or involving the exercise of any labor or ingenuity on the part of the user.

The prongs or tines of the fork $a\ a\ a\ a$ may be constructed of any approved form or size adapted to the use in view. They are attached to or constructed in a solid piece, with a base-plate, A, the rear edge of which is formed into a hinge, $c'$, to which is joined, by the pivot $d$, the eye $c$, forming the outer end of the tang $b$, so that the two parts A and $b$ form, together, a hinge-joint, which works freely as such, when not held in a locked state, in either the position shown in fig. 3 or fig. 4, by the catches $f$ or $h$. These catches $f$ and $h$ are attached respectively to the loose ends of the springs $e$ and $g$; these springs being firmly attached at their other ends, by rivets $m\ m$, to the tang $b$, and the elastic force of the springs tending to keep the catches $f$ and $h$ pressed towards each other. Upon the back side of the plate A is an inclined counter-catch, $j$, and a rib, $i$, between which is a groove to receive the catch or pawl $h$, as seen in fig. 3, in which position the pawl is firmly held by the force of the spring $g$, and by means of which the fork is firmly held in the extended position shown when it is to be used as an ordinary fork.

When it is desired, however, to change the fork into a rake, hoe, or grapnel, as shown in fig. 4, the pawl $h$ is withdrawn from its groove, by means of the ring $l$, (or any other suitable catch, lug, or knob,) and the points of the tines pressed forward, when the inclined end of catch $f$ comes into contact with the front side of the plate A and slides upon its surface, the spring $e$ yielding under the pressure, until the catch enters the square or rectangular opening $k$ made in said plate, and passing entirely through said opening or slot until the hook of the catch passes the edge of the slot, when the reaction of the spring $e$ causes the said hook to firmly catch over the said edge and hold the tines of the fork rigidly in the position shown in fig. 4, in which form it may be used for all the purposes of a rake, hoe, or grapnel.

When it is desired to restore the tines to the normal position of a fork, a moderate pressure of the foot upon the end of catch $f$ releases it from its hold upon the slot $k$, and the tines may then be turned back to the position shown in fig. 3, and *vice versa*.

Having thus described my invention, so as to enable others skilled in the art to make and use it, what I claim, and desire to secure by Letters Patent, is—

The combination of the springs $e$ and $g$, provided with catches $f$ and $h$, with the hinges $c\ c'$ of the tang $b$ and plate A of a manure or other fork; said plate being provided with a slot, $k$, counter-catch $j$, and rib $i$, all combined and arranged substantially as and for the purpose set forth.

WILLIAM TRUBY.

Witnesses:
A. R. EVANS,
JOHN TRUBY.